(12) United States Patent
Mardikar et al.

(10) Patent No.: US 9,977,908 B2
(45) Date of Patent: May 22, 2018

(54) IMPLEMENTATION AND MANAGEMENT OF INFORMATION SECURITY FOR DISTRIBUTED DATA STORAGE SYSTEMS

(71) Applicant: Tata Consultancy Services Limited, Mumbai (IN)

(72) Inventors: Nandkishor Janardan Mardikar, Mumbai (IN); Sameer Deshpande, Mumbai (IN); Shivaranjani C. Sulikeri, Mumbai (IN); Sanjay Gupta, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 176 days.

(21) Appl. No.: 15/010,767

(22) Filed: Jan. 29, 2016

(65) Prior Publication Data

US 2016/0259946 A1 Sep. 8, 2016

(30) Foreign Application Priority Data

Mar. 5, 2015 (IN) .......................... 739/MUM/2015

(51) Int. Cl.
*G06F 21/00* (2013.01)
*G06F 21/60* (2013.01)
(Continued)

(52) U.S. Cl.
CPC ............. *G06F 21/604* (2013.01); *G06F 8/60* (2013.01); *G06F 21/577* (2013.01); *G06Q 10/0635* (2013.01); *H04L 63/20* (2013.01)

(58) Field of Classification Search
CPC ................................ G06F 21/604; G06F 8/60
(Continued)

(56) References Cited

U.S. PATENT DOCUMENTS

| 2015/0066995 A1* | 3/2015 | Kwon ............... G06F 17/30569 707/809 |
| 2015/0163242 A1* | 6/2015 | Laidlaw ................ G06F 21/552 726/22 |
| 2015/0269383 A1* | 9/2015 | Lang ....................... G06F 21/57 726/1 |

OTHER PUBLICATIONS

Moll, L. et al. (2012). "Accelerate Big Data Adoption with Less Risk and Complexity," Oracle, 52 pages.
(Continued)

*Primary Examiner* — Anthony Brown
(74) *Attorney, Agent, or Firm* — Finnegan, Henderson, Farabow, Garrett & Dunner LLP

(57) ABSTRACT

This disclosure relates generally to information security, and more particularly to implementation and management of information security of a Big Data environment of an organization. In one embodiment, security related inputs are received from a user and are converted into security requirement. Thereafter, a security policy template is identified from plurality of pre-defined security policy templates based on security reference architecture and the security requirement. The security policy template represents a plurality of security controls. Thereafter, one or more security controls are selected from the security controls based on the security requirement. Further, one or more existing security controls implemented in Big Data environment are identified. Thereafter, the selected security controls are compared with the existing security controls for determining a security control that is not implemented in the Big Data environment. Subsequently, the security control is implemented in the Big Data environment to provide security to the Big Data of the organization.

19 Claims, 3 Drawing Sheets

(51) Int. Cl.
  *G06F 9/445*  (2018.01)
  *G06F 21/57*  (2013.01)
  *H04L 29/06*  (2006.01)
  *G06Q 10/06*  (2012.01)

(58) Field of Classification Search
  USPC .......................................................... 726/1
  See application file for complete search history.

(56) References Cited

OTHER PUBLICATIONS

Mardikar, N., SIG: The Network for Sourcing Executives. (2016). "Big Data Adoption—IT Infrastructure Services Perspective," located at http://sig.org/newsletter.php?id=8169 visited on May 20, 2016 (3 pages).

Mardikar, N. (2013). "Big Data Adoption—Infrastructure Considerations," *Tata Consultancy Services White Paper*, 15 pages.

* cited by examiner

IMPLEMENTATION AND MANAGEMENT OF INFORMATION SECURITY FOR DISTRIBUTED DATA STORAGE SYSTEMS

PRIORITY CLAIM

This U.S. patent application claims priority under 35 U.S.C. § 119 to: India Application No. 739/MUM/2015, filed on Mar. 5, 2015. The entire contents of the aforementioned application are incorporated herein by reference.

TECHNICAL FIELD

This disclosure relates generally to information security, and more particularly to implementation and management of information security of a Big Data environment of an organization.

BACKGROUND

In recent years, organizations have seen substantial growth in data volume. Continuous collection of large datasets that record information, such as customer interactions, product sales, results from advertising campaigns on the internet by organizations, data coming from social media and mobile devices, etc., has led to a substantial growth in data volume. Many organizations today are facing tremendous challenges in managing the data due to the sudden growth in data volume, and also the unstructured nature of data. Consequently, storage and analysis of large volumes of data have emerged as a challenge for many enterprises, both big and small, across all industries. In recent years, Big Data technology, such as Hadoop, and NoSQL (Not only SQL) technology have been widely adopted due to its capability of handling large sets of structured as well as unstructured data.

SUMMARY

Embodiments of the present disclosure present technological improvements as solutions to one or more of the above-mentioned technical problems recognized by the inventors in conventional systems. For example, in one embodiment, an information security system for securing Big Data of an organization, the information security system comprising a processor; an interaction module coupled to the processor to obtain one or more security related inputs from a user for a Big Data environment deployed in the organization, convert the one or more security related inputs into at least one security requirement for the Big Data environment, a security policy designer coupled to the processor to identify a security policy template from amongst a plurality of pre-defined security policy templates based on a security reference architecture and the at least one security requirement, wherein the security policy template represents a plurality of security controls, and wherein the security reference architecture is indicative of the plurality of security controls categorized in a plurality of security layers and security control selection rules, select one or more security controls from amongst the plurality of security controls based on the at least one security requirement; a determination module coupled to the processor to identify one or more existing security controls implemented in the Big Data environment based on at least one environment parameter, compare the selected one or more security controls with the one or more existing security controls implemented in the Big Data environment to determine a security control from amongst the selected one or more security controls that is not implemented in the Big Data environment; and implement the security control in the Big Data environment to provide security to the Big Data of the organization.

In another embodiment, a method for providing security to Big Data of an organization, the method comprising, obtaining one or more security related inputs from a user for a Big Data environment deployed in the organization, converting the one or more security related inputs into at least one security requirement for the Big Data environment, identifying a security policy template from amongst a plurality of pre-defined security policy templates based on a security reference architecture and the at least one security requirement, wherein the security policy template represents a plurality of security controls, and wherein the security reference architecture is indicative of the plurality of security controls categorized in a plurality of security layers and security control selection rules, selecting one or more security controls from amongst the plurality of security controls based on the at least one security requirement, identifying one or more existing security controls implemented in the Big Data environment based on at least one environment parameter, comparing the selected one or more security controls with the one or more existing security controls implemented in the Big Data environment to determine a security control from amongst the selected one or more security controls that is not implemented in the Big Data environment; and implementing the security control in the Big Data environment to provide security to the Big Data of the organization.

In yet another embodiment, a non-transitory computer-readable medium having embodied thereon a computer program for executing a method comprising, obtaining one or more security related inputs from a user for a Big Data environment deployed in an organization, converting the one or more security related inputs into at least one security requirement for the Big Data environment, identifying a security policy template from amongst a plurality of pre-defined security policy templates based on a security reference architecture and the at least one security requirement, wherein the security policy template represents a plurality of security controls, and wherein the security reference architecture is indicative of the plurality of security controls categorized in a plurality of security layers and security control selection rules, selecting one or more security controls from amongst the plurality of security controls based on the at least one security requirement, identifying one or more existing security controls implemented in the Big Data environment based on at least one environment parameter, comparing the selected one or more security controls with the one or more existing security controls implemented in the Big Data environment to determine a security control from amongst the selected one or more security controls that is not implemented in the Big Data environment; and implementing the security control in the Big Data environment to provide security to the Big Data of the organization.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles

DETAILED DESCRIPTION

Figure 1:
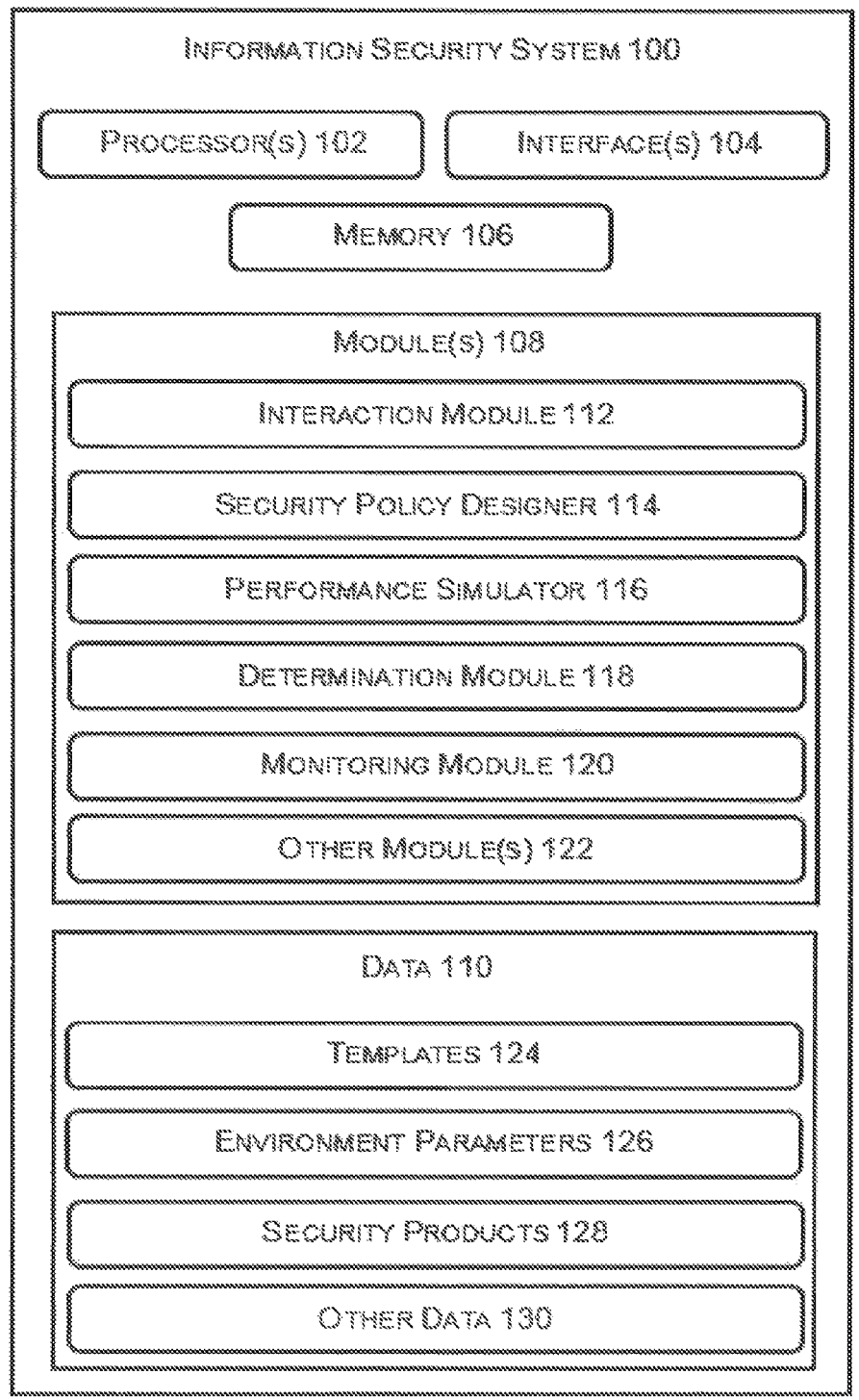
FIG. 1 illustrates a schematic diagram of an information security system for securing Big Data of an organization, according to an embodiment of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

With increase in volume of data being generated and the unstructured nature of data, organizations are adopting Big Data environment to store and analyze the large volumes of data. In an example, the Big Data environment may include Big Data technologies, such as Hadoop, NoSQL (Not only SQL) technologies, such as Cassandra, or a combination of the Big Data technologies and the NoSQL technologies.

Owing to the continuous increase in the amount of data and lack of control by organizations, information security has become a concern for many organizations. Many organizations have started implementing security measures for Big Data environment. In one example, the information security may be implemented through one or more executable modules. However, the security measures implemented by the organizations are generally limited to point security solutions such that each point security solution may address a specific security need. As would be understood, such point security solutions may address only specific security need. In such a case, other security needs which have not been identified, may never get addressed. Thus, such security measures fail to provide comprehensive security coverage across the Big Data environment.

For providing a comprehensive security coverage, a large number of point security solutions may have to be individually implemented. However, implementation of such a large number of point security solutions may be time consuming and involve a lot of complexities. Further, the point security solutions may have overlapping functionalities. As a result, for a given problem, it may not be practically possible for a person, such as a security architect of an organization to select an optimum set of point security solutions from amongst the available point security solutions to comprehensively resolve the problem.

In accordance with the present subject matter, a system and a method for implementation and management of information security for providing security to Big Data of an organization are described. According to an implementation, information related to a Big Data environment that is deployed in the organization is obtained from a user. In one example, the user may be an employee of the organization, such as a security architect of the organization. The Big Data environment may be indicative of a type of technology that is deployed in the organization. For example, the Big Data environment may include Big Data technologies, such as Hadoop, NoSQL technologies, such as Cassandra, or a combination of the Big Data technologies and the NoSQL technologies.

Continuing with the present implementation, subsequently, one or more security related inputs are obtained, for example, from the user. The at least one security related input may be associated with the Big Data environment characteristics and business requirements of the organization. Examples of the security related input include, but are not limited to, "Industry vertical for the Big Data environment to be secured", "Primary use case for the Big Data environment", "Compliance with specific regulatory requirements", "Nature of the intended usage", "Key characteristic indicator for the environment" and "Key technology indicator for the environment".

Thereafter, the one or more security related inputs obtained from the user are converted into at least one security requirement for the Big Data environment. In one example, a data repository may be maintained that stores a plurality of security requirements. Accordingly, whenever the security related inputs are received from the user, at least one security requirement that is relevant to the security related inputs is retrieved from the data repository. Subsequently, a security policy template is identified from amongst a plurality of pre-defined security policy templates. The security template may represent a plurality of security controls. According to an example, the security policy template is identified based on a security reference architecture and the at least one security requirement. The security reference architecture is indicative of the plurality of security controls categorized in a plurality of security layers and security control selection rules.

Thereafter, one or more security controls are selected from amongst a plurality of security controls based on the at least one security requirement. For instance, if a security requirement is "Tag sensitive data", then security controls "Data at Rest encryption" and "Intrusion prevention" may be selected from the list of the security controls. Once the security controls are selected, one or more existing security controls that are currently implemented in the Big Data environment are identified. In one example, the security controls that are already implemented in the Big Data environment may be identified based on environment parameters indicative of characteristics of the Big Data environment. For instance, if the Big Data environment includes Hadoop technology, then the environment parameters of the Hadoop technology may be indicative of Hadoop cluster details, such as version, node information, etc., and Hadoop core security implementation, such as Kerberos and Access Control List (ACL).

Thereafter, the selected one or more security controls are compared with the one or more existing security controls implemented in the Big Data environment to determine a security control from amongst the selected one or more security controls that is not implemented in the Big Data environment. On determining the security control that is not implemented in the Big Data environment, the security control is implemented in the Big Data environment to provide security to the Big Data of the organization.

The present subject matter thus facilitates in improving existing security mechanisms implemented in the organization to enhance Big Data security of the environment. Further, security requirements of the user, such as the security architect are holistically captured based on the security reference architecture, thereby ensuring comprehensive security mechanism, and reducing risk and cost associated with the security setup. Further, the present subject matter enables the user to discover a current security setup in the organization. This helps the user to automatically move from the current or the existing security setup to a comprehensive security setup. Moreover, the Big Data security architecture provides comprehensive coverage to the Big Data specific security requirements at granular level. Thus, according to the present subject matter, implementation of the security architecture in the organization provides security to the Big Data of the organization, and is efficient in terms of time, cost, and resources.

The following disclosure describes a system and a method for implementation and management of information security providing security to Big Data of an organization. While aspects of the described system and method can be implemented in any number of different computing systems, environments, and/or configurations, embodiments for implementation and management of information security for providing security to Big Data of an organization are described in the context of the following exemplary system(s) and method(s).

FIG. 1 illustrates a schematic diagram of an information security system 100 for securing Big Data of an organization, according to an embodiment of the present subject matter.

According to an implementation, the information security system 100 may be implemented in a variety of computing systems, such as a laptop computer, a desktop computer, a notebook, a workstation, a mainframe computer, a server, a network server, and the like. In one example, the information security system 100 may be implemented for a specific customer in customer or third party data centers. In another example, the information security system 100 may be implemented for a set of customers with multi-tenancy model.

In one implementation, the information security system 100 may provide a mechanism to realize Big Data security reference architecture. In one example, the security reference architecture is indicative of a plurality of security controls categorized in a plurality of security layers and security control selection rules. The security reference architecture provides comprehensive coverage of all security concerns in Big Data environment. The security reference architecture may also facilitate in identifying interdependencies between various concerns and how these dependencies affect each concern. The security reference architecture may also provide a requirement driven mechanism for selection of a security technology for a given concern. The selection of the security technology may be based on security requirements, industry domain inputs, and intended use cases.

The information security system 100 includes processor(s) 102, interface(s) 104, and memory 106 coupled to the processor(s) 102. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 may be configured to fetch and execute computer-readable instructions stored in the memory 106.

The memory 106 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the interface(s) 104 may include a variety of software and hardware interfaces, for example, interfaces for peripheral device(s), such as a product board, a mouse, an external memory, and a printer. Additionally, the interface(s) 104 may enable the information security system 100 to communicate with other devices, such as web servers and external repositories.

The information security system 100 also includes module(s) 108 and data 110. The module(s) 108 include, for example, an interaction module 112, a security policy designer 114, a performance simulator 116, a determination module 118, a monitoring module 120, and other module(s) 122. The other modules 122 may include programs or coded instructions that supplement applications or functions performed by the information security system 100. The data 110 may include templates 124, environment parameters 126, security products 128, and other data 130. Further, the other data 130, amongst other things, may serve as a repository for storing data that is processed, received, or generated as a result of the execution of one or more modules in the module(s) 108.

Although the data 110 is shown internal to the information security system 100, the data 110 can also be implemented external to the information security system 100, where the data 110 may be stored within a database communicatively coupled to the information security system 100. Further, the data 110 contained within such external database may be periodically updated. For example, new data 110 may be added into the database, existing data 110 may be modified, or non-useful data 110 may be deleted from the database.

In one embodiment of the present subject matter, the information security system 100 is implemented for implementation and management of information security for distributed data storage systems. In an implementation, the information security system 100 is implemented for providing security to Big Data of an organization, the interaction module 112 of the information security system 100 may obtain one or more security related inputs from a user associated with the organization. The security related input may be obtained for a Big Data environment deployed in the organization. In an example, the user may be a security architect of the organization. The security related inputs may be related to characteristics of the Big Data environment or the business perspective of the organization. In an example, the Big Data environment may include Big Data technologies, such as Hadoop, NoSQL technologies, such as Cassandra, or a combination of the Big Data technologies and the NoSQL technologies. Further, examples of the security related inputs include, but are not limited to, "Industry vertical for the Big Data environment to be secured", "Primary use case for the Big Data environment", "Compliance with specific regulatory requirements, such as Payment Card Industry Data Security Standard (PCI DSS) regulations", "Nature of the intended usage", "Key characteristic indicator for the environment" and "Key technology indicator for the environment". According to an example, an interface may be rendered to the user such that the user is provided with various options of security related inputs, and the user has to select one or more options.

Thereafter, the interaction module 112 may convert the security related inputs into at least one security requirement for the Big Data environment. In one example, the security related inputs are converted into security requirements based on the security reference architecture. In one example, the interaction module 112 may implement a rule engine to derive comprehensive security requirements based on the one or more security related inputs. For instance, if a security related input is "Compliance with PCI DSS regulations", then the interaction module 112 may derive the security requirements "Anonymization of tagged data elements in non-production environments" and "Access restriction in production environment".

Thereafter, the security policy designer 114 identifies a security policy template from amongst a plurality of predefined security policy templates. The security policy template may be identified based on the security reference model and the at least one requirement. The security policy template may represent a plurality of security controls. In one example, the security policy designer 114 may retrieve the plurality of security policy templates stored in the templates 124 to identify the security policy template which corresponds to the security requirements. As described above, the security policy template may represent various security controls corresponding to security requirements. A security control may be indicative of a security measure to be implemented for a respective security requirement. Accordingly, the security policy designer 114 may identify a suitable security policy template based on environment parameters and the security requirements. In one example, the security policy designer 114 may identify the security policy template based on environment parameters, such as the type of the Big Data environment, Big Data technologies used, data sensitivity involved, and current security infrastructure available in the organization.

As described above, the security policy designer 114 may identify the security policy template based on the security requirements. In one example, if the security requirement is "Tag sensitive data", then the security policy designer 114 may identify the security policy template which has controls "Data at Rest encryption" and "Intrusion prevention" in Data Security Layer.

According to an example, various security requirements and corresponding security controls are depicted in Table 1 (provided below).

TABLE 1

| S. No. | SECURITY REQUIREMENT | SECURITY CONTROL |
|---|---|---|
| 1. | Protect stored cardholder data | Data at Rest encryption (selective or across cluster) |
| 2. | Encrypt transmission of cardholder data across open, public networks | Data in Motion encryption (at cluster edge or across the cluster) |
| 3. | Do not use vendor-supplied defaults for system passwords and other security parameters | Default configuration identification and prevention |
| 4. | Tagging of sensitive data | Data classification Data ACL Data at Rest encryption Intrusion prevention |
| 5. | Minimum human intervention | Automated verification of security setup |
| 6. | Provenance of all activities related to the security administration | Segregation of duties Tracking of all activities in security administration |

Continuing with the present implementation, once the security policy designer 114 identifies the security policy template, the security policy designer 114 may render the security policy template to the user for customization. The user may modify the security policy template according to his needs. Once the user customizes the security policy template, the security policy template may be saved as a security policy for the Big Data environment. The security policy may be implemented for the Big Data environment to provide security to the Big Data of the organization. According to an implementation, the security policy designer 114 may replicate the security policy of another Big Data environment deployed in the organization. In an example, the security policy designer 114 may create security policy entirely from the existing security controls implemented in the Big Data environment. In another example, the security policy designer 114 may recommend security products corresponding to the security controls to the user.

For designing a security policy for a cluster, for example, for Big Data technology, such as Hadoop, or any of the NoSQL technology, such as Cassandra, the security policy designer 114 may obtain information related to the cluster and security requirements. The information may be related to data sensitivity (low, medium, or high), workload characteristics (data intensive, processing intensive, network intensive), regulatory compliance requirements (no, yes), and environment type (production or non-production). Based on the user inputs, the security policy designer 114 may recommend a security policy template to the user. Subsequently, the user may use the recommended security policy template for designing the security policy or may select existing security policy for the cluster for customization.

Thereafter, the security policy designer 114 may display the security policy template and the security policy to the user for customization. The security policy may include different sections for different categories of security controls. The different categories being, for example, Core Hadoop, Operating System (OS), Data, Application, and Network. The user may enable or disable specific security controls from each section. Further, the user may also view information, such as security products being used, cluster level, dependencies, and the like. Once the security policy is created, in one example, the security policy designer 114 may provide an option to the user to validate the security policy. In another example, the security policy designer 114 may verify the security controls that the user has modified to analyze the dependencies.

The security policy designer 114 may also map the security controls with current security technology available in the cluster and notify the gaps to the user. For example, the security policy designer 114 may identify changes made to the security policy and provide the changes to the user for confirmation. The security policy designer 114 may also identify the changes made to the security policy which cannot be directly implemented. For example, due to dependencies on external systems or possible significant impact on the current workload, it may be difficult to implement the security policy. In such a case, the security policy designer 114 notifies the user to seek changes to the security policy. Once the verification of the security policy is completed, the security policy designer 114 may provide the security policy to the determination module 118 for implementation in the Big Data environment of the organization. As described earlier, the Big Data environment may include Big Data technologies and any of NoSQL technologies, where the Big Data technologies may include Hadoop.

Continuing with the present implementation, once the security policy template is selected and the security policies are designed, the security policy designer 114 may generate a visual model for the Big Data environment. The visual model depicts the security policy template and the security policies. The user may customize the security policy template for specific scenarios or based on organization security policies. For example, the user may change the security controls or add new security controls. The customized security policy template may be later used to design Big Data environment specific security policies.

Taking an example of the Hadoop technology, the security policy designer 114 may receive an input from the user as to whether to model the current or existing security policies of the Hadoop cluster or to model a new security policy template and security policies. The security policy designer 114 also obtains information of the Hadoop cluster. The information may include cluster type, deployment details, and security products available in the Hadoop cluster for each category of the security control. Subsequently, based on the cluster deployment details, the security policy designer 114 may draw the cluster deployment diagram with all nodes and their interconnections. Further, based on the cluster deployment details, the security policy designer 114 may draw the security product nodes at appropriate location in the deployment diagram. For example, Knox may be depicted as gateway node.

Subsequently, the security policy designer 114 may depict the security controls associated with each of the entity in the cluster diagram using color icons. In one example, the security policy designer 114 may depict different categories of security controls with different icons at different locations on a canvas. For instance, the security policy designer 114 may depict Kerberos security enablement with a green circle icon. The various categories of the security controls may cover the core Hadoop security controls, OS security controls, Data security controls, and application security controls. In one example, all the entities drawn by the security policy designer 114 on the canvas may be clickable and may display additional information about a specific entity and security controls associated with it. For example, the user may click on a green star that may be appearing at a top right corner of the canvas to view SELinux policy details. Further, the user may disable the SELinux for all nodes in the cluster. The user may also save the cluster model along with all the changes made to the security controls. In one example, the security policy designer 114 may apply the changes to corresponding security policies to reflect the changes globally. Once the changes are applied to the security policies, the security policy status may change to "Pending Application". In an example, the user may trigger the process of applying the security policy changes to physical Hadoop cluster. Accordingly, the security policy designer 114 may apply the security policy to the actual Hadoop cluster through the determination module 118. The security policies may be implemented for example, to segregate sensitive and non-sensitive data in the same Big Data cluster, to segregate applications based on performance needs, to configure federated Big Data environment, and to ensure specific regulatory compliance.

Thereafter, the performance simulator 116 may simulate the Big Data environment to ascertain performance of the Big Data environment. The performance simulator 116 may also simulate an impact on a functionality of the Big Data based on changes in the security controls. For instance, the performance simulator 116 may simulate the performance of Big Data cluster based on model of the cluster obtained from the security policy designer 114 and security product specific rules for security overhead. According to an example, the user may initiate a performance simulation process for a cluster in the information security system 100. The user may select a particular type of workload scenario for the given cluster type. The cluster type may be Big Data technology, such as Hadoop.

Subsequently, the performance simulator 116 may receive model of the cluster obtained from the security policy designer 114. From the workload scenario, the performance simulator 116 receives a percentage of nodes to be used for each phase of the workload (map, shuffle, reduce), and total data volume to be processed. Based on the cluster model, the performance simulator 116 calculates total data to be processed on each node and data transfer between the nodes for specific phases. Based on the data volume for each node and phase and the rule-base for specific workload, the performance simulator 116 may decide processing component weightage, such as data processing for each node (data volume processes), control traffic over network (node-to-node communication—non data transfer), node-to-node data transfer over network, and peripheral node communication. Communication of all these weightages provides the overall performance baseline factor (PBF) for cluster without security. According to an implementation, the performance simulator 116 calculates the PBF for a cluster using an expression (1) provided below:

$$PBF = DP + CT + NDT + PNC \quad (1)$$

where PBF represents performance baseline factor for a cluster without security, DP represents data processing for each node (data volume processes), CT represents control traffic over network (node-to-node communication—non data transfer), NDT represents node-to-node data transfer over network, and PNC represents peripheral node communication.

Thereafter, based on the cluster model, the performance simulator 116 determines the controls applicable for each of the processing component. The performance simulator 116 obtains the Impact Weightage (W) of a security control for a particular processing component from a rule base. For each of the processing component, the performance simulator 116 combines processing component weightage and all corresponding security control impact weightages to obtain the processing component weightage considering security (PBF$_{Secure}$). According to an implementation, the performance simulator 116 may obtain the performance baseline factor for a cluster with security using an expression (2) provided below:

$$PBF_{Secure} = (DP*W1*W2*\ldots Wn) + \\ (CT*W1*W2*\ldots Wn) + (NDT*W1* W2*\ldots \\ Wn) + (PNC*W1*W2*\ldots Wn) \quad (2)$$

where PBF$_{secure}$ represents performance baseline factor for a cluster with security, DP represents data processing for each node (data volume processes), CT represents control traffic over network (node-to-node communication—non data transfer), NDT represents node-to-node data transfer over network, PNC represents peripheral node communication, and W represents an impact weightage of a security control for a particular processing component.

The impact weightage may have different value for each security control for each processing component. The impact weightage may also vary based on the technology being used for realizing the security control. Subsequently, the performance simulator 116 may calculate Performance Overhead (PO) to quantify the impact of security on performance. According to an implementation, the performance simulator 116 may calculate the PO using an expression (3) provided below:

$$PO = \frac{PBF_{Secure}}{PBF} \quad (3)$$

where PO represents performance overhead, $PBF_{secure}$ represents performance baseline factor for a cluster with security, and PBF represents performance baseline factor for a cluster without security.

In one example, the performance simulator 116 may calculate performance overhead for different combinations of security controls and different workload scenarios so that user can decide on the fit-for-purpose security policy for the given cluster.

Once the performance of the cluster is simulated, the determination module 118 may identify one or more existing security controls implemented in the Big Data environment based on at least one environment parameter. The environment parameters are stored in the environment parameters 126. The determination module 118 may also determine a security product corresponding to each of the one or more existing security controls, and where a security product implements a respective existing security control.

In one example, the determination module 118 may use a rule base to identify cluster type based on environment parameters. The rule base may also be used to determine appropriate discovery templates to be used. The discovery templates include a set of parameters to be discovered for each type of the cluster. For Hadoop cluster, examples of environment parameters include Hadoop cluster details, such as version, node information, specific implementation details like location of NameNode, ResourceManager and DataNodes, high availability implementation, and the like, Hadoop core security implementation (Kerberos setup, users and key tab information, security specific configurations, etc.), and other security implementations (OS level security, such as SELinux; other security products implemented and their configuration—Knox Gateway, Sentry, etc.).

According to an example, the user may initiate the duster discovery process in the information security system 100. The determination module 118 may obtain information from the user, such as seed node location and privilege user name and password for the node. Subsequently, the determination module 118 may connect to the seed node and based on pre-defined rules, ascertain the type of the duster. For instance, the type of the duster may be Hadoop duster. Thereafter, the determination module 118, utilizes cluster-type specific component discovery templates to discover additional information about the cluster, such as Hadoop version, location of NameNode, ResourceManager and DataNodes, installation details (Hadoop home, configuration, data and log directory, and ports used by various services). Further, the determination module 118 uses this information and the cluster-type specific component discovery templates to obtain security related information, such as users running various Hadoop specific processes, Hadoop file system ownership and permissions (both local and HDFS), OS level security details including firewall and SELinux configurations, Kerberos security setup (native library version, keytab locations, and security configurations including port numbers).

Thereafter, the determination module 118 uses cluster-type specific component discovery templates, rule base, and standard verification tests to obtain additional security related information, such as peripheral security systems implemented (sentry, Knox, data encryption) and configuration details about each section. The determination module 118 utilizes the above mentioned information to update the cluster definition with cluster configuration metadata and security related metadata.

Further, the determination module 118 compares the selected one or more security controls with the one or more existing security controls implemented in the Big Data environment. The determination module 118 further determines a security control from amongst the selected one or more security controls that is not implemented in the Big Data environment. Upon determination, the determination module 118 implements the security control in the Big Data environment to provide security to the Big Data of the organization. For example, if the selected security controls are "Data at Rest encryption" and "Intrusion prevention", and the existing security controls that are pre-implemented in the Big Data environment are "Isolation of the Big Data environment from rest of the infrastructure", "Data masking for development and test environment", and "Intrusion prevention", then the determination module 118 may implement the security control "Data at Rest encryption" in the Big Data environment. The determination module 118 may further determine changes to be made to the one or more existing security controls based on the comparison of the selected one or more security controls with the one or more existing security controls implemented in the Big Data environment.

According to an implementation, the determination module 118 may auto-reconfigure security controls based on user inputs and also automatically leverage existing Big Data security products within an enterprise. The determination module 118 may also integrate existing enterprise security technologies, such as log analysis, privilege account management, and the like. According to an example, the determination module 118 may poll for all scheduled security policy updates. Further, the determination module 118 may obtain security policies and corresponding cluster details. Using the information in rule-base, the determination module 118 may decide the prerequisites and desired cluster state to apply the security policies. If any of the prerequisites are not met or cluster is not in a state where the security setup can be changed, the determination module 118 may notify administrator of the information security system 100 about the same and wait for remediation. Using the information in rule-base, the determination module 118 may further decide on the sequence of implementation. Based on the security products involved, the determination module 118 may also decide which component configuration template are to be used. The component configuration templates may be stored in templates 124. The component configuration templates may include defined steps for configuring specific security controls with respect to specific security product. The determination module 118 may also decide and initialize product specific configuration connectors.

Subsequently, the determination module 118 executes the security control implementation based on the sequence decided. For each control, the determination module 118 may use the steps as defined in component configuration template. The steps may be executed through the product specific configuration connectors which can directly interact with the Hadoop cluster or the specific security products. All the steps may be logged in database for reporting purpose. Once the execution is completed, the determination module 118 notifies the user for carrying out post-configuration processes.

According to an implementation, the monitoring module 120 may periodically monitor the one or more existing security controls implemented in the Big Data environment to determine whether the one or more existing security controls deviate from a security policy. On determining the one or more existing security controls may be deviating from the security policy, the monitoring module 120 may initiate an action for the Big Data environment. In one example, the action may be enforcing and validating consistent security controls on each node of clusters.

According to an implementation of the present subject matter, the monitoring module 120 may receive a user request to monitor a subset of the Big Data environment against a security policy. In response to the user request, the monitoring module 120 may monitor the subset of the Big Data environment against the security policy. The monitoring module 120 may conduct periodic or on-demand automated audit of entire Big Data environment or subset of it against set of security policies.

According to an example, the monitoring module 120 may perform periodic or on-demand audit of the entire Big Data environment or a subset of it for compliance against a set of security policies. The monitoring module 120 may use a set of components and scripts to scan the Big Data environment for specific security control configurations. Further, the monitoring module 120 may compare the scanned data with the security policy defined for the cluster to determine deviations, if any. The monitoring module 120 may also identify the inconsistencies in the security configurations across various nodes within the cluster. The audits can be scheduled based on various parameters, such as time based, data ingestion event based or ad-hoc.

According to another example, the monitoring module 120 may perform periodic or on-demand audit of the Big Data environment for compliance against regulatory requirements. The monitoring module 120 may use a set of components and scripts to scan the Big Data environment for specific security control configurations. Further, the monitoring module 120 may compare the scanned data with mandatory security controls required for specific regulatory requirements to determine deviations, if any. According to yet another example, the monitoring module 120 may monitor the entire Big Data environment or subset of it against a set of security policies in real-time. The monitoring module 120 may also gather feeds from various security products deployed in the Big Data environment, analyze the feeds, and generate near real-time alerts of any security related event.

In one implementation, the user may request audit of specific cluster or user may schedule periodic audit of the cluster. The monitoring module 120 may wait for the ad-hoc or scheduled audit requests. On receiving the request, the monitoring module 120 may obtain the security policy and corresponding cluster details. Using the information in the rule-base, the monitoring module 120 may decide the prerequisites and desired cluster state to audit the security policies. If any of the prerequisites are not met or cluster is not in a state where the security setup can be audited, the monitoring module 120 may notify the administrator of the information security system 100 about the same and wait for remediation. Based on the type of audit, the monitoring module 120 may decide the specific sub-modules to be used. Using the information in the rule base, the monitoring module 120 may decide on the sequence of controls to be audited. Based on the products involved, the monitoring module 120 may decide which validation template is to be used. The validation templates may include defined steps for auditing specific security control with respect to specific security product. The monitoring module 120 may also decide and initialize product specific validation connectors.

Further, the monitoring module 120 may execute the security controls audit steps based on the sequence decided. For each control, the monitoring module 120 may utilize the steps as defined in validation templates. The steps may be executed through the product specific validation connectors which can directly interact with the Hadoop cluster or the specific security products. Subsequently, all the results may be logged in database for reporting purpose. Once the execution is completed, the monitoring module 120 may notify the user about the audit results. Accordingly, once the security is implemented, the monitoring module 120 may identify any security gaps introduced due to any changes in the Big Data environment over the normal course of operations.

The monitoring module 120 may further inspect data and application communication between a Big Data duster and any external entity. For this, the monitoring module 120 scans jobs by trusted entity, scan the jobs before submitting to the duster, validate/filter end-point input, and enforce data-at-rest protection (data encryption) consistently across Big Data technologies and across different clusters. The monitoring module 120 may also carry out specific action in case any security event is identified through the near real-time monitoring. On receiving the notification of the event, the monitoring module 120 may use the environment parameters and the rule base to instruct the determination module 118 to carry out certain preventive and corrective actions, such as "Quarantine specific node of the Big Data cluster in case of security breach", "Restrict specific users in case of security breach" and "Isolate specific job/application in case of security breach".

According to an implementation, the monitoring module 120 may further provide a dashboard view of the Big Data environment to the user. In one example, the dashboard view may represent consolidated view of the Big Data environment from topology and security perspective. The dashboard view allows the user to view information related to the Big Data environment. In one example, the information may include security policies, and status of the Big Data environment. Through the dashboard view, the monitoring module 120 may integrate various security products and technologies available as point solutions for Big Data environment and providing single interface to access them. The monitoring module 120 may provide a single portal to the user for viewing various security aspects related to multiple Big Data clusters. The dashboard view allows the user to view information related to the cluster metadata, the visual model of the Big Data cluster security architecture, available security policies and security policy templates, and status of regular or ad-hoc audits of the Big Data environment. The dashboard view also allows the user to drill down on specific finding and the associated security control details.

Further, the monitoring module 120 may also implement role based mechanism for managing security setup of the Big Data environment within the organization. In one example, the monitoring module 120 may define role based mechanism for managing or administering Big Data environment ensuring segregation of duties. The various roles may include Big Data information security manager primary roles, Big Data information security manager cluster specific roles, and cluster technology specific roles.

The present subject matter thus facilitates in improving existing security mechanisms implemented in the organization to enhance Big Data security of the environment. Further, security requirements of the user, such as the security architect are holistically captured based on the security reference architecture, thereby ensuring comprehensive security mechanism, and reducing risk and cost associated with the security architecture. Further, the present subject matter enables the user to discover a current security setup within the organization. This helps the user to automatically move from the current or the existing security setup to a comprehensive security setup. Furthermore, recommendations for additional security products to be implemented, and changes those are to be made to the existing security products to fulfill the security requirements may be provided to the user. Moreover, the Big Data security architecture provides comprehensive coverage to the Big Data specific security requirements at granular level. Also, the present subject matter facilitates in designing, implementing, and managing end-to-end security of a Big Data environment through a single interface for the user, and providing centralized remote security management of the entire Big Data environment. As described above, the user is allowed to select a specific level of security to be enabled in the organization. Thus, according to the present subject matter, implementation of the security architecture in the organization provides security to the Big Data of the organization, and is efficient in terms of time, cost, and resources.

Figure 2A:
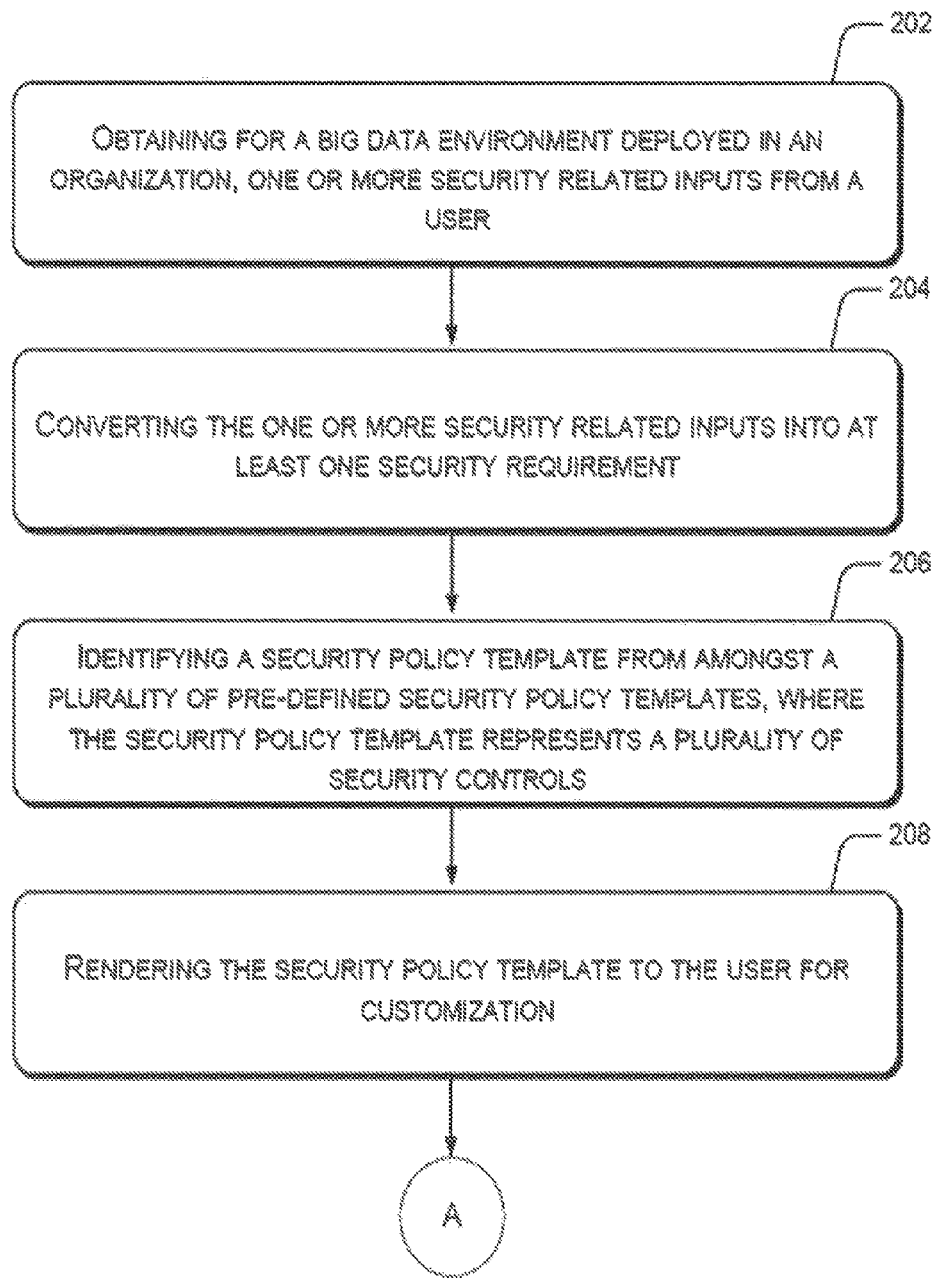
FIGS. 2A and 2B illustrate a method for providing security to the Big Data of the organization, according to an embodiment of the present subject matter.
Figure 2B:
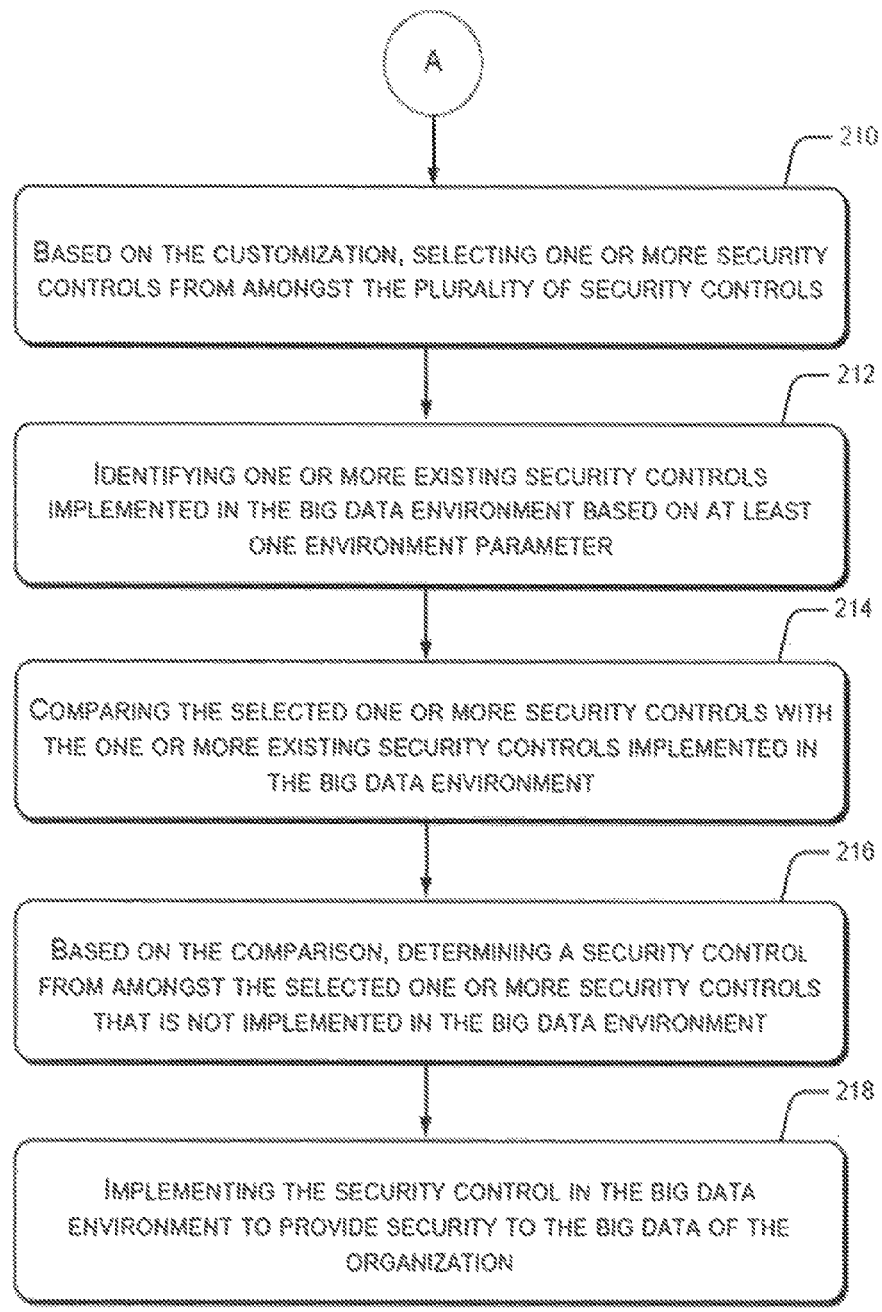

FIGS. 2A and 2B illustrates a method 200 for providing security to the Big Data of the organization, according to an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network.

The order in which the method 200 is described is not intended to be construed as a limitation, and any number of the described method blocks can be combined in any order to implement the method 200, or an alternative method. Furthermore, the method 200 can be implemented in any suitable hardware, software, firmware or combination thereof.

At block 202, the method 200 includes obtaining for a big data environment deployed in an organization, one or more security related inputs from a user. The one or more security related inputs may be associated with business requirements of the organization. Examples of the security related inputs include, but are not limited to, "Industry vertical for the Big Data environment to be secured", "Primary use case for the Big Data environment", "Compliance with specific regulatory requirements such as PCI DSS regulations", "Nature of the intended usage", "Key characteristic indicator for the environment", and "Key technology indicator for the environment". In accordance with one implementation of the present subject matter, the interaction module 112 of the information security system 100 obtains the security related inputs from the user associated with the organization.

At block 204, the method 200 includes converting the one or more security related inputs into at least one security requirement. In one example, the security related inputs are converted into the security requirements using security reference architecture. The security reference architecture is indicative of a plurality of security controls categorized in a plurality of security layers and security control selection rules. In an implementation, the interaction module 112 may convert the security related inputs into the security requirements.

At block 206, the method 200 includes identifying a security policy template from amongst a plurality of pre-defined security policy templates, where the security policy template represents a plurality of security controls. In one example, the security policy template is identified based on the security requirement and the security reference architecture. In one example, the security policy designer 114 identifies the security policy template from amongst a plurality of pre-defined security policy templates.

At block 208, the method 200 rendering the security policy template to the user for customization. The user may customize the security policy template for specific scenarios or based on organization security policies. For example, the user may change the security controls or add new security controls. In one implementation, the security policy designer 114 renders the security policy template to the user for customization.

At block 210, the method 200 includes based on the customization, selecting one or more security controls from amongst the plurality of security controls. Once the user customizes the security policy template according to his need, one or more security controls are selected from the customized security policy templates. In one implementation, the security policy designer 114 may select the one or more security controls from amongst the plurality of security controls, based on the customized security policy templates.

At block 212, the method 200 includes identifying one or more existing security controls implemented in the big data environment based on at least one environment parameter. In one example, the security controls that are already implemented in the Big Data environment may be identified based on environment parameters indicative of characteristics of the Big Data environment. For instance, if the Big Data environment includes Hadoop technology, then the environment parameters of the Hadoop technology may be indicative of Hadoop cluster details, such as version, node information, etc., and Hadoop core security implementation. In an implementation, the determination module 118 may identify the one or more existing security controls implemented in the big data environment based on at least one environment parameter.

At block 214, the method 200 includes comparing the selected one or more security controls with the one or more existing security controls implemented in the big data environment. In one implementation, the determination module 118 may compare the selected one or more security controls with the one or more existing security controls implemented in the big data environment.

At block 216, the method 200 includes based on the comparison, determining a security control from amongst the selected one or more security controls that is not implemented in the big data environment. In one implementation, the determination module 118 may determine a security control from amongst the selected one or more security controls that is not implemented in the big data environment.

At block 218, the method 200 includes implementing the security control in the big data environment to provide security to the big data of the organization. For example, if the selected security controls are "Data at Rest encryption" and "Intrusion prevention", and the existing security controls that are pre-implemented in the Big Data environment are "Isolation of the Big Data environment from rest of the infrastructure", "Data masking for development and test environment", and "Intrusion prevention", then the determination module 118 may implement the security control "Data at Rest encryption" in the Big Data environment.

Although embodiments for methods and systems for implementation and management of information security for distributed data storage systems have been described in a language specific to structural features and/or methods, it is to be understood that the present subject matter is not necessarily limited to the specific features or methods described. Rather, the specific features and methods are disclosed as exemplary embodiments for implementation and management of information security for distributed data storage systems.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An information security system for securing Big Data of an organization, the information security system comprising:
    a processor;
    an interaction module coupled to the processor to:
        obtain one or more security related inputs from a user for a Big Data environment deployed in the organization, wherein the one or more security related inputs are characteristics of the Big Data environment; and
        convert the one or more security related inputs into at least one security requirement for the Big Data environment;
    a security policy designer coupled to the processor to:
        identify a security policy template from amongst a plurality of pre-defined security policy templates based on a security reference architecture and the at least one security requirement, wherein the security policy template represents a plurality of security controls, and wherein the security reference architecture is indicative of the plurality of security controls categorized in a plurality of security layers and security control selection rules; and
        select one or more security controls from amongst the plurality of security controls based on the at least one security requirement;
    a determination module coupled to the processor to:
        identify one or more existing security controls implemented in the Big Data environment based on at least one environment parameter, wherein the at least one environment parameter includes a type of the Big Data environment, one or more Big Data technologies used, a data sensitivity involved and a security infrastructure available in the organization;
        compare the selected one or more security controls with the one or more existing security controls implemented in the Big Data environment to determine a security control from amongst the selected one or more security controls that is not implemented in the Big Data environment; and
        implement the security control in the Big Data environment to provide security to the Big Data of the organization.

2. The information security system of claim 1, wherein the determination module further is to determine changes to be made to the one or more existing security controls based on the comparison of the selected one or more security controls with the one or more existing security controls implemented in the Big Data environment.

3. The information security system of claim 1, wherein the security policy designer further is to:
    render the security policy template to the user for customization;
    based on the customization, select the one or more security controls from amongst the plurality of security controls;
    design one or more security policies based on the selected one or more security controls; and
    implement the one or more security policies in the Big Data environment to provide security to the Big Data of the organization.

4. The information security system of claim 3, wherein the security policy designer further is to replicate the one or more security policies of another Big Data environment deployed in the organization.

5. The information security system of claim 1, the security policy designer further is to generate a visual model for the Big Data environment, wherein the visual model depicts at least one of the security policy template, one or more security policies, and information related to Big Data environment.

6. The information security system of claim 1, wherein the determination module further is to determine a security product corresponding to each of the one or more existing security controls, and wherein a security product implements a respective existing security control.

7. The information security system of claim 1, further comprises a monitoring module coupled to the processor to:
    periodically monitor the one or more existing security controls implemented in the Big Data environment to determine whether the one or more existing security controls deviate from a security policy; and
    on determining the one or more existing security controls to be deviating from the security policy, initiate an action for the Big Data environment.

8. The information security system of claim 7, wherein the monitoring module is to:
  receive a user request to monitor a subset of the Big Data environment against a security policy; and
  in response to the user request, monitor the subset of the Big Data environment against the security policy.

9. The information security system of claim 7, wherein the monitoring module further is to provide a dashboard view of the Big Data environment to the user, wherein the dashboard view allows the user to view information related to the Big Data environment, and wherein the information includes security policies, and status of the Big Data environment.

10. The information security system of claim 1, further comprises a performance simulator to:
  simulate the Big Data environment to ascertain performance of the Big Data environment; and
  simulate an impact on a functionality of the Big Data based on changes in the security controls.

11. A method for providing security to Big Data of an organization, the method comprising:
  obtaining, via one or more hardware processors, one or more security related inputs from a user for a Big Data environment deployed in the organization, wherein the one or more security related inputs are characteristics of the Big Data environment;
  converting, via the one or more hardware processors, the one or more security related inputs into at least one security requirement for the Big Data environment;
  identifying, via the one or more hardware processors, a security policy template from amongst a plurality of pre-defined security policy templates based on a security reference architecture and the at least one security requirement, wherein the security policy template represents a plurality of security controls, and wherein the security reference architecture is indicative of the plurality of security controls categorized in a plurality of security layers and security control selection rules;
  selecting, via the one or more hardware processors, one or more security controls from amongst the plurality of security controls based on the at least one security requirement;
  identifying, via the one or more hardware processors, one or more existing security controls implemented in the Big Data environment based on at least one environment parameter, wherein the at least one environment parameter includes type of the Big Data environment, Big Data technologies used, data sensitivity involved and security infrastructure available in the organization;
  comparing, via the one or more hardware processors, the selected one or more security controls with the one or more existing security controls implemented in the Big Data environment to determine a security control from amongst the selected one or more security controls that is not implemented in the Big Data environment; and
  implementing, via the one or more hardware processors, the security control in the Big Data environment to provide security to the Big Data of the organization.

12. The method of claim 11, wherein identifying the one or more security controls comprises:
  rendering the security policy template to the user for customization;
  based on the customization, selecting the one or more security controls from amongst the plurality of security controls;
  creating one or more security policies based on the selected one or more security controls; and
  implementing the one or more security policies in the Big Data environment to provide security to the Big Data of the organization.

13. The method of claim 11, further comprises:
  generating a visual model for the Big Data environment, wherein the visual model depicts at least one of the security policy template, one or more security policies, and information related to Big Data environment.

14. The method of claim 11, further comprises:
  determining changes to be made to the one or more existing security controls based on the comparison of the selected one or more security controls with the one or more existing security controls implemented in the Big Data environment.

15. The method of claim 11, further comprises:
  monitoring the one or more existing security controls implemented in the Big Data environment to determine whether the one or more existing security controls deviates from a security policy; and
  on determining the one or more existing security controls to be deviating from the security policy, initiating an action for the Big Data environment.

16. The method of claim 11, further comprises providing a dashboard view of the Big Data environment to the user, wherein the dashboard view allows the user to view information related to the Big Data environment, and wherein the information includes security policies, and status of the Big Data environment.

17. The method of claim 11, further comprises determining a security product corresponding to each of the one or more existing security controls, wherein a security product implements a respective existing security control.

18. The method of claim 11, wherein the Big Data environment comprises Big Data technologies, NoSQL technologies, and a combination of the Big Data technologies and the NoSQL technologies.

19. A non-transitory computer-readable medium having embodied thereon a computer program for executing a method comprising:
  obtaining one or more security related inputs from a user for a Big Data environment deployed in an organization, wherein the one or more security related inputs are characteristics of the Big Data environment;
  converting the one or more security related inputs into at least one security requirement for the Big Data environment;
  identifying a security policy template from amongst a plurality of pre-defined security policy templates based on a security reference architecture and the at least one security requirement, wherein the security policy template represents a plurality of security controls, and wherein the security reference architecture is indicative of the plurality of security controls categorized in a plurality of security layers and security control selection rules;
  selecting one or more security controls from amongst the plurality of security controls based on the at least one security requirement;
  identifying one or more existing security controls implemented in the Big Data environment based on at least one environment parameter, wherein the at least one environment parameter includes type of the Big Data environment, Big Data technologies used, data sensitivity involved and security infrastructure available in the organization;
  comparing the selected one or more security controls with the one or more existing security controls implemented in the Big Data environment to determine a security control from amongst the selected one or more security controls that is not implemented in the Big Data environment; and implementing the security control in the Big Data environment to provide security to the Big Data of the organization.

* * * * *